(12) United States Patent
Ominsky et al.

(10) Patent No.: US 10,955,182 B2
(45) Date of Patent: Mar. 23, 2021

(54) DYNAMIC PACKING SYSTEM

(71) Applicant: FreshRealm, LLC, Ventura, CA (US)

(72) Inventors: Dave Ominsky, Camarillo, CA (US); Brian Wallin, Moorpark, CA (US); John Grogg, Oxnard, CA (US); Kyle Hoberg, Moorpark, CA (US); Alan West, Camarillo, CA (US)

(73) Assignee: FreshRealm, LLC, Ventura, CA (US)

( * ) Notice: Subject to any disclaimer, the term of this patent is extended or adjusted under 35 U.S.C. 154(b) by 131 days.

(21) Appl. No.: 16/183,358

(22) Filed: Nov. 7, 2018

(65) Prior Publication Data

US 2019/0137162 A1     May 9, 2019

Related U.S. Application Data (60) Provisional application No. 62/582,831, filed on Nov. 7, 2017.

(51) Int. Cl.
| | |
|---|---|
| *F25D 11/00* | (2006.01) |
| *G06Q 10/08* | (2012.01) |
| *F25D 29/00* | (2006.01) |
| *F25D 3/06* | (2006.01) |

(52) U.S. Cl.
CPC .......... *F25D 11/003* (2013.01); *F25D 29/003* (2013.01); *G06Q 10/0832* (2013.01); *F25D 3/06* (2013.01)

(58) Field of Classification Search
CPC ........ F25D 3/06; F25D 11/003; F25D 29/003; G06Q 10/0832

USPC .................................................. 700/213–230
See application file for complete search history.

(56) References Cited

U.S. PATENT DOCUMENTS

| | | | |
|---|---|---|---|
| 712,783 | A | 11/1902 | Easdown |
| 1,966,410 | A | 7/1934 | Kaufmann |
| 3,275,393 | A | 9/1966 | Stentz et al. |
| 3,547,661 | A | 12/1970 | Stevenson |
| 4,052,589 | A | 10/1977 | Wyatt |
| 5,403,997 | A | 4/1995 | Wimpee et al. |
| 5,639,131 | A | 6/1997 | Fuehrer |
| 5,697,061 | A | 12/1997 | Krueger et al. |

(Continued)

FOREIGN PATENT DOCUMENTS

| | | |
|---|---|---|
| CN | 201457996 | 5/2005 |
| CN | 1646381 | 7/2005 |

(Continued)

*Primary Examiner* — Michael Collins (74) *Attorney, Agent, or Firm* — Stetina Brunda Garred & Brucker (57) ABSTRACT

A dynamic packing system places one or more perishable items into a shipping container and dispenses thermal control components therein. There is a data processor and a database including one or more order data set each defined at least by an itemized list of purchased perishable items and an order shipment destination address. A network interface is connected to the data processor, and weather data is retrieved over the network interface from a remote source. A dispenser controlled by the data processor positions a specific amount of a thermal control component in the shipping container. The specific amount is based upon an evaluation of one or more temperature values corresponding to the weather data along a transport route of the shipping container.

20 Claims, 5 Drawing Sheets

(56) References Cited

U.S. PATENT DOCUMENTS

| | | |
|---|---|---|
| 5,798,694 A | 8/1998 | Reber et al. |
| 5,969,606 A | 10/1999 | Reber et al. |
| 6,073,789 A | 6/2000 | Lundblade |
| 6,105,818 A | 8/2000 | Speranza |
| 6,327,576 B1 | 12/2001 | Ogasawara |
| 6,411,916 B1 | 6/2002 | Pellerin |
| 6,453,687 B2 | 9/2002 | Sharood et al. |
| 6,502,409 B1 | 1/2003 | Gatling et al. |
| 6,653,602 B2 | 11/2003 | Li |
| 6,698,222 B2 | 3/2004 | Sanna et al. |
| 6,892,545 B2 | 5/2005 | Ishikawa et al. |
| 6,892,546 B2 | 5/2005 | Singh et al. |
| 6,963,851 B1 | 11/2005 | Szabo et al. |
| 6,965,871 B1 | 11/2005 | Szabo et al. |
| 6,982,640 B2 | 1/2006 | Lindsay et al. |
| 7,009,519 B2 | 3/2006 | Leonard et al. |
| 7,050,991 B2 | 5/2006 | Ogasawara |
| 7,053,773 B2 | 5/2006 | McGarry et al. |
| 7,060,953 B2 | 6/2006 | Ishikawa et al. |
| 7,065,501 B1 | 6/2006 | Brown et al. |
| 7,096,221 B2 | 8/2006 | Nakano |
| 7,130,814 B1 | 10/2006 | Szabo et al. |
| 7,132,926 B2 | 11/2006 | Vaseloff et al. |
| 7,183,518 B2 | 2/2007 | Near et al. |
| 7,196,625 B1 | 3/2007 | Nguyen |
| 7,258,064 B2 | 8/2007 | Vaseloff et al. |
| 7,260,438 B2 | 8/2007 | Caldwell et al. |
| 7,292,146 B1 | 11/2007 | Nguyen |
| 7,293,422 B2 | 11/2007 | Parachini et al. |
| 7,301,439 B2 | 11/2007 | Hashimoto et al. |
| 7,315,247 B2 | 1/2008 | Jung et al. |
| 7,367,198 B2 | 5/2008 | Behr |
| 7,372,003 B2 | 5/2008 | Kates |
| 7,389,919 B2 | 6/2008 | Walker et al. |
| 7,448,546 B2 | 11/2008 | Jung et al. |
| 7,464,873 B2 | 12/2008 | Spencer et al. |
| 7,490,054 B2 | 2/2009 | Reade et al. |
| 7,495,558 B2 | 2/2009 | Pope et al. |
| 7,617,132 B2 | 11/2009 | Reade et al. |
| 7,680,691 B2 | 3/2010 | Kimball et al. |
| 7,692,536 B2 | 4/2010 | Channell |
| 7,716,935 B2 | 5/2010 | Kim et al. |
| 7,717,292 B2 | 5/2010 | Faust, III |
| 7,764,183 B2 | 7/2010 | Burchell et al. |
| 7,776,601 B2 | 8/2010 | De Gaulle et al. |
| 7,844,509 B2 | 11/2010 | Bodin et al. |
| 7,853,477 B2 | 12/2010 | O'Shea et al. |
| 7,861,542 B2 | 1/2011 | Rozendaal et al. |
| 7,895,257 B2 | 2/2011 | Helal et al. |
| 7,905,402 B2 | 3/2011 | Kwak et al. |
| 7,907,054 B1 | 3/2011 | Nguyen |
| 7,930,221 B2 | 4/2011 | Brown et al. |
| 7,944,338 B2 | 5/2011 | Nemoto et al. |
| 7,954,712 B2 | 6/2011 | Babcock et al. |
| 7,982,622 B2 | 7/2011 | Burchell et al. |
| 8,010,211 B2 | 8/2011 | Hendrickson et al. |
| 8,051,381 B2 | 11/2011 | Ebrom et al. |
| 8,056,738 B2 | 11/2011 | Phillips |
| 8,101,892 B2 | 1/2012 | Kates |
| 8,130,102 B1 | 3/2012 | Nguyen |
| 8,141,852 B1 | 3/2012 | Gresham |
| 8,164,457 B2 | 4/2012 | Dunlap et al. |
| 8,226,414 B2 | 7/2012 | Bodin et al. |
| 8,228,197 B2 | 7/2012 | Murray |
| 8,242,907 B2 | 8/2012 | Butler et al. |
| 8,242,908 B2 | 8/2012 | Butler et al. |
| 8,242,911 B2 | 8/2012 | Moore et al. |
| 8,248,238 B2 | 8/2012 | Butler et al. |
| 8,248,239 B2 | 8/2012 | Butler et al. |
| 8,253,567 B2 | 8/2012 | Butler et al. |
| 8,264,318 B2 | 9/2012 | Ebrom et al. |
| 8,269,630 B2 | 9/2012 | Butler et al. |
| 8,279,065 B2 | 10/2012 | Butler et al. |
| 8,284,055 B2 | 10/2012 | Butler et al. |
| 8,294,579 B2 | 10/2012 | Butler et al. |
| 8,314,678 B2 | 11/2012 | Ebrom et al. |
| 8,321,302 B2 | 11/2012 | Bauer et al. |
| 8,325,011 B2 | 12/2012 | Butler et al. |
| 8,327,659 B2 | 12/2012 | Winkler et al. |
| 8,368,541 B2 | 2/2013 | Moore et al. |
| 8,371,135 B2 | 2/2013 | Lee |
| 8,390,456 B2 | 3/2013 | Puleston et al. |
| 8,395,476 B2 | 3/2013 | Ebrom et al. |
| 8,421,630 B2 | 4/2013 | Butler et al. |
| 8,461,959 B2 | 6/2013 | Ebrom et al. |
| 8,463,651 B2 | 6/2013 | Connors et al. |
| 8,464,544 B2 | 6/2013 | Shin et al. |
| 8,477,007 B2 | 7/2013 | McCoy et al. |
| 8,558,699 B2 | 10/2013 | Butler et al. |
| 8,577,759 B2 | 11/2013 | Solomon |
| 8,631,063 B2 | 1/2014 | Helal et al. |
| 8,676,718 B2 | 3/2014 | Villegas |
| 8,715,210 B2 | 5/2014 | Orlando |
| 8,756,122 B2 | 6/2014 | Lowenstein |
| 8,762,209 B2 | 6/2014 | Walker et al. |
| 8,941,470 B2 | 1/2015 | Butler et al. |
| 8,947,233 B2 | 2/2015 | Butler et al. |
| 8,988,223 B2 | 3/2015 | Puleston et al. |
| 9,046,290 B2 | 6/2015 | Wyn-Davies et al. |
| 9,074,806 B2 | 7/2015 | Cheon et al. |
| 9,087,333 B2 | 7/2015 | Kim et al. |
| 9,092,773 B2 | 7/2015 | Daly et al. |
| 9,117,128 B2 | 8/2015 | Mats et al. |
| 9,208,520 B2 | 12/2015 | Brown |
| 9,349,238 B2 | 5/2016 | Tkachenko et al. |
| 9,361,568 B2 | 6/2016 | Butler et al. |
| 9,390,362 B2 | 7/2016 | Butler et al. |
| 9,400,966 B2 | 7/2016 | Dertadian |
| 9,405,950 B2 | 8/2016 | Mats et al. |
| 9,411,989 B2 | 8/2016 | Wild |
| 9,412,086 B2 | 8/2016 | Morse et al. |
| 9,418,263 B2 | 8/2016 | Butler et al. |
| 9,424,447 B2 | 8/2016 | Puleston et al. |
| 9,430,732 B2 | 8/2016 | Mats et al. |
| 9,449,208 B2 | 9/2016 | Luk et al. |
| 9,465,559 B2 | 10/2016 | Butler et al. |
| 9,471,821 B2 | 10/2016 | Mats et al. |
| 9,477,962 B2 | 10/2016 | Worrall et al. |
| 9,482,429 B2 | 11/2016 | Poston et al. |
| 9,542,577 B2 | 1/2017 | Butler et al. |
| 9,547,851 B2 | 1/2017 | Brown |
| 9,594,998 B2 | 3/2017 | Butler et al. |
| 9,691,114 B2 | 6/2017 | Ashrafzadeh et al. |
| 9,710,682 B2 | 7/2017 | Butler et al. |
| 9,747,606 B2 | 8/2017 | Stoulil |
| 9,818,250 B2 | 11/2017 | Carroll et al. |
| 9,821,344 B2 | 11/2017 | Zsigmond et al. |
| 9,842,290 B2 | 12/2017 | Butler et al. |
| 9,858,452 B2 | 1/2018 | Butler et al. |
| 9,909,801 B2 | 3/2018 | Cheon et al. |
| 9,934,657 B2 | 4/2018 | Tkachenko et al. |
| 9,946,904 B2 | 4/2018 | Burchell et al. |
| 9,953,193 B2 | 4/2018 | Butler et al. |
| 9,953,332 B2 | 4/2018 | Bateman |
| 9,965,814 B2 | 5/2018 | Becker et al. |
| 10,605,674 B1 * | 3/2020 | Holbrook ............... B65D 81/38 |
| 2002/0000092 A1 | 1/2002 | Sharood et al. |
| 2002/0016739 A1 | 2/2002 | Ogasawara |
| 2002/0022991 A1 | 2/2002 | Sharood et al. |
| 2002/0059175 A1 | 5/2002 | Nakano |
| 2002/0143624 A1 | 10/2002 | Catan |
| 2002/0143860 A1 | 10/2002 | Catan |
| 2002/0157411 A1 | 10/2002 | Ishikawa et al. |
| 2002/0189267 A1 | 12/2002 | Singh et al. |
| 2003/0030539 A1 | 2/2003 | McGarry et al. |
| 2003/0033824 A1 | 2/2003 | Sanna et al. |
| 2003/0122455 A1 | 7/2003 | Caldwell |
| 2003/0213718 A1 | 11/2003 | Ducharme et al. |
| 2003/0216969 A1 | 11/2003 | Bauer et al. |
| 2004/0056761 A1 | 3/2004 | Vaseloff et al. |
| 2004/0078272 A1 | 4/2004 | Brown et al. |
| 2004/0100380 A1 | 5/2004 | Lindsay et al. |
| 2004/0103033 A1 | 5/2004 | Reade et al. |
| 2004/0103043 A1 | 5/2004 | Reade et al. |

(56) References Cited

U.S. PATENT DOCUMENTS

| | | |
|---|---|---|
| 2004/0124988 A1 | 7/2004 | Leonard et al. |
| 2004/0148949 A1 | 8/2004 | Parachini et al. |
| 2004/0166583 A1 | 8/2004 | De Gaulle et al. |
| 2004/0243353 A1* | 12/2004 | Aghassipour .......... G06Q 10/08 702/187 |
| 2005/0068182 A1 | 3/2005 | Dunlap et al. |
| 2005/0091996 A1 | 5/2005 | Ishikawa et al. |
| 2005/0098625 A1 | 5/2005 | Walker et al. |
| 2005/0149391 A1 | 7/2005 | O'Shea et al. |
| 2005/0211775 A1 | 9/2005 | Vaseloff et al. |
| 2005/0248455 A1 | 11/2005 | Pope et al. |
| 2005/0258961 A1 | 11/2005 | Kimball et al. |
| 2005/0278065 A1 | 12/2005 | Garza |
| 2006/0006987 A1 | 1/2006 | Hashimoto et al. |
| 2006/0125639 A1 | 6/2006 | Jung et al. |
| 2006/0178947 A1 | 8/2006 | Zsigmond et al. |
| 2006/0190363 A1 | 8/2006 | Brown et al. |
| 2006/0191885 A1 | 8/2006 | Near et al. |
| 2006/0213904 A1 | 9/2006 | Kates |
| 2006/0272341 A1 | 12/2006 | Shin et al. |
| 2007/0006604 A1 | 1/2007 | Behr |
| 2007/0016852 A1 | 1/2007 | Kim et al. |
| 2007/0131698 A1 | 6/2007 | Antal |
| 2007/0131766 A1 | 6/2007 | Kwak et al. |
| 2007/0152048 A1 | 7/2007 | Jung et al. |
| 2007/0176772 A1 | 8/2007 | Nemoto et al. |
| 2007/0193293 A1 | 8/2007 | Hostetler et al. |
| 2007/0210923 A1 | 9/2007 | Butler et al. |
| 2007/0235528 A1 | 10/2007 | Spencer et al. |
| 2007/0236346 A1 | 10/2007 | Helal et al. |
| 2007/0273507 A1 | 11/2007 | Burchell et al. |
| 2008/0046345 A1 | 2/2008 | Serre |
| 2008/0052001 A1 | 2/2008 | Bodin et al. |
| 2008/0052200 A1 | 2/2008 | Bodin et al. |
| 2008/0052201 A1 | 2/2008 | Bodin et al. |
| 2008/0071628 A1 | 3/2008 | Walker et al. |
| 2008/0156626 A1 | 7/2008 | Buschmann |
| 2008/0157928 A1 | 7/2008 | Butler et al. |
| 2008/0164975 A1 | 7/2008 | Butler et al. |
| 2008/0164977 A1 | 7/2008 | Butler et al. |
| 2008/0178629 A1 | 7/2008 | Meether |
| 2008/0180249 A1 | 7/2008 | Butler et al. |
| 2008/0186137 A1 | 8/2008 | Butler et al. |
| 2008/0186138 A1 | 8/2008 | Butler et al. |
| 2008/0186139 A1 | 8/2008 | Butler et al. |
| 2008/0186180 A1 | 8/2008 | Butler et al. |
| 2008/0204246 A1 | 8/2008 | Kates |
| 2008/0211630 A1 | 9/2008 | Butler et al. |
| 2008/0250797 A1 | 10/2008 | Rozendaal et al. |
| 2008/0252459 A1 | 10/2008 | Butler et al. |
| 2008/0257839 A1 | 10/2008 | Phillips |
| 2009/0002166 A1 | 1/2009 | Channell |
| 2009/0029014 A1 | 1/2009 | Walter et al. |
| 2009/0037288 A1 | 2/2009 | Christensen |
| 2009/0040012 A1 | 2/2009 | Ebrom et al. |
| 2009/0040013 A1 | 2/2009 | Ebrom et al. |
| 2009/0040045 A1 | 2/2009 | Walter et al. |
| 2009/0040066 A1 | 2/2009 | Ebrom et al. |
| 2009/0040067 A1 | 2/2009 | McCoy et al. |
| 2009/0044137 A1 | 2/2009 | Bartley et al. |
| 2009/0045926 A1 | 2/2009 | Ebrom et al. |
| 2009/0144081 A1 | 6/2009 | Harlan |
| 2009/0183808 A1 | 7/2009 | Sappington et al. |
| 2009/0234839 A1 | 9/2009 | Angell et al. |
| 2009/0237215 A1 | 9/2009 | Dunlap et al. |
| 2009/0254220 A1 | 10/2009 | Shin et al. |
| 2009/0261093 A1 | 10/2009 | Fullerton et al. |
| 2009/0277199 A1 | 11/2009 | Manas et al. |
| 2009/0282859 A1 | 11/2009 | Glielmo et al. |
| 2009/0289776 A1 | 11/2009 | Moore et al. |
| 2010/0065632 A1 | 3/2010 | Babcock et al. |
| 2010/0102076 A1 | 4/2010 | Hendrickson et al. |
| 2010/0102082 A1 | 4/2010 | Ebrom et al. |
| 2010/0106521 A1 | 4/2010 | Ashrafzadeh et al. |
| 2010/0117819 A1 | 5/2010 | Murray |
| 2010/0134257 A1 | 6/2010 | Puleston et al. |
| 2010/0138281 A1 | 6/2010 | Zhang et al. |
| 2010/0161082 A1 | 6/2010 | Ebrom et al. |
| 2010/0179881 A1 | 7/2010 | Wiederstein |
| 2010/0271184 A1 | 10/2010 | Burchell et al. |
| 2010/0275625 A1 | 11/2010 | Lowenstein |
| 2010/0301056 A1 | 12/2010 | Wolfe |
| 2011/0031839 A1 | 2/2011 | Fullerton et al. |
| 2011/0126555 A1 | 6/2011 | Lee |
| 2011/0153614 A1 | 6/2011 | Solomon |
| 2011/0154375 A1 | 6/2011 | Helal et al. |
| 2011/0162418 A1 | 7/2011 | Ronci et al. |
| 2011/0184812 A1 | 7/2011 | Stoulil |
| 2011/0197624 A1 | 8/2011 | Al-Rasheed |
| 2011/0248038 A1 | 10/2011 | Mayer |
| 2011/0296852 A1 | 12/2011 | Wyn-Davies et al. |
| 2012/0012493 A1 | 1/2012 | Cleveland et al. |
| 2012/0047050 A1 | 2/2012 | Solomon |
| 2012/0169468 A1 | 7/2012 | Butler et al. |
| 2012/0169469 A1 | 7/2012 | Butler et al. |
| 2012/0169474 A1 | 7/2012 | Butler et al. |
| 2012/0182123 A1 | 7/2012 | Butler et al. |
| 2012/0206243 A1 | 8/2012 | Butler et al. |
| 2012/0260683 A1 | 10/2012 | Cheon et al. |
| 2012/0261479 A1 | 10/2012 | Moore et al. |
| 2012/0271742 A1 | 10/2012 | Solomon |
| 2012/0278190 A1 | 11/2012 | Brown |
| 2012/0303492 A1 | 11/2012 | Connors et al. |
| 2012/0319823 A1 | 12/2012 | Butler et al. |
| 2013/0103605 A1 | 4/2013 | Villegas |
| 2013/0176115 A1 | 7/2013 | Puleston et al. |
| 2013/0193011 A1 | 8/2013 | Scanlan et al. |
| 2013/0214938 A1 | 8/2013 | Kim et al. |
| 2014/0006198 A1 | 1/2014 | Daly et al. |
| 2014/0028445 A1 | 1/2014 | Wild |
| 2014/0032362 A1 | 1/2014 | Frayman |
| 2014/0055244 A1 | 2/2014 | Burchell et al. |
| 2014/0122167 A1 | 5/2014 | Jung et al. |
| 2014/0122168 A1 | 5/2014 | Jung et al. |
| 2014/0122169 A1 | 5/2014 | Jung et al. |
| 2014/0122184 A1 | 5/2014 | Jung et al. |
| 2014/0122260 A1 | 5/2014 | Jung et al. |
| 2014/0122261 A1 | 5/2014 | Jung et al. |
| 2014/0122262 A1 | 5/2014 | Jung et al. |
| 2014/0122296 A1 | 5/2014 | Jung et al. |
| 2014/0180953 A1 | 6/2014 | Westcott et al. |
| 2014/0203915 A1 | 7/2014 | Puleston et al. |
| 2014/0252091 A1 | 9/2014 | Morse et al. |
| 2014/0292490 A1 | 10/2014 | Butler et al. |
| 2014/0297738 A1 | 10/2014 | King |
| 2014/0310115 A1 | 10/2014 | Walker et al. |
| 2014/0316561 A1 | 10/2014 | Tkachenko et al. |
| 2015/0039347 A1* | 2/2015 | Sharma ............. G06Q 10/0833 705/4 |
| 2015/0061840 A1 | 3/2015 | Butler et al. |
| 2015/0112759 A1 | 4/2015 | Hong et al. |
| 2015/0129666 A1 | 5/2015 | Butler et al. |
| 2015/0130593 A1 | 5/2015 | Mats et al. |
| 2015/0149250 A1 | 5/2015 | Fein et al. |
| 2015/0267960 A1 | 9/2015 | Cheon et al. |
| 2015/0302234 A1 | 10/2015 | Mats et al. |
| 2015/0312348 A1 | 10/2015 | Lustgarten |
| 2015/0317667 A1 | 11/2015 | Wohlert et al. |
| 2015/0324681 A1 | 11/2015 | Mats et al. |
| 2015/0324745 A1 | 11/2015 | Goodall et al. |
| 2015/0356809 A1 | 12/2015 | Carroll et al. |
| 2016/0027094 A1 | 1/2016 | Chamyvelumani |
| 2016/0034907 A1 | 2/2016 | Worrall et al. |
| 2016/0048709 A1 | 2/2016 | Butler et al. |
| 2016/0048712 A1 | 2/2016 | Butler et al. |
| 2016/0086146 A1 | 3/2016 | Brown |
| 2016/0113438 A1 | 4/2016 | Hanson et al. |
| 2016/0117583 A1 | 4/2016 | Butler et al. |
| 2016/0140526 A1 | 5/2016 | Cummins et al. |
| 2016/0140646 A1 | 5/2016 | Humphreys |
| 2016/0162715 A1 | 6/2016 | Luk et al. |
| 2016/0180382 A1 | 6/2016 | Bhagwan et al. |
| 2016/0196527 A1 | 7/2016 | Bose et al. |
| 2016/0210084 A1 | 7/2016 | Butler et al. |

(56) References Cited

U.S. PATENT DOCUMENTS

| | | |
|---|---|---|
| 2016/0239696 A1 | 8/2016 | Mats et al. |
| 2016/0314327 A1 | 10/2016 | Butler et al. |
| 2016/0321480 A1 | 11/2016 | Hamlin et al. |
| 2017/0011384 A1 | 1/2017 | Tkachenko et al. |
| 2017/0061174 A1 | 3/2017 | Butler et al. |
| 2017/0147915 A1 | 5/2017 | Butler et al. |
| 2017/0270323 A1 | 9/2017 | Butler et al. |
| 2018/0053140 A1 | 2/2018 | Baca et al. |
| 2018/0068211 A1 | 3/2018 | Butler et al. |
| 2018/0114257 A1 | 4/2018 | Conville et al. |
| 2018/0127192 A1 | 5/2018 | Cohen |
| 2018/0204029 A1 | 7/2018 | Butler et al. |

FOREIGN PATENT DOCUMENTS

| | | |
|---|---|---|
| CN | 201138334 | 10/2008 |
| CN | 202497012 | 10/2012 |
| WO | 9014295 | 11/1990 |
| WO | 2015076949 A1 | 5/2015 |

\* cited by examiner

DYNAMIC PACKING SYSTEM

CROSS-REFERENCE TO RELATED APPLICATIONS

This application relates to and claims the benefit of U.S. Provisional Application No. 62/582,831 filed Nov. 7, 2017 and entitled "DYNAMIC PACKING SYSTEM," the entire disclosure of which is hereby wholly incorporated by reference.

STATEMENT RE: FEDERALLY SPONSORED RESEARCH/DEVELOPMENT

Not Applicable

BACKGROUND

1. Technical Field

The present disclosure relates generally to a logistics and freight, and more particularly to a dynamic packing system for packaging perishable goods with internal thermal control components.

2. Related Art

A porter is a box containing perishable items, in particular, various food ingredients, in a refrigerated environment, and packing techniques and systems implementing packing algorithms to make the most effective use of the space therein are known in the art. Ice packs or blocks are placed within the container together with the food ingredients. A need for providing external temperature conditions to account for thermal seepage into or out of the porter was identified, as food quality may be improved if the exact needed amount of ice packs/blocks, or other thermal control component can be determined to account for ambient temperature throughout its transportation route.

The amount of ice contained in a porter at any given point in time is understood to be dependent upon its current location and the heat sensitivity of particular food items. Conventionally, ice packs or blocks may be placed in the porter in various locations to maintain the internal temperature at levels optimal to the preservation of the food item until reaching the consumer. On a transport that may span anywhere from a few hours up to two days, external outside temperature conditions may affect the porter. To prevent food from being frozen, or warmed to unsafe conditions, the internal temperature of the porter is ideally maintained between thirty two degrees Fahrenheit (32° F.) and thirty nine degrees Fahrenheit (39° F.). The volume and positioning of the ice packs or blocks within the container is contemplated to maintain the correct temperature during the entirety of the transport, and there are known configurations of porters with optimized temperature control such as those disclosed in U.S. Pat. App. Pub. No. 2015/0060440 to Lippold et al., the disclosure of which is hereby incorporated by reference in its entirety.

Although such devices allow for the transport of perishable items with greater interior temperature stability, the interior temperature of porters may vary based upon ambient temperature fluctuations. The impact may be particularly acute during extremely hot summer months in regions where the ambient temperature rises beyond ninety to a hundred degrees Fahrenheit, or during extremely cold winter months where the ambient temperature is below freezing. Refrigerated and otherwise temperature-stabilized transport vehicles/containers may be utilized, but the costs associated therewith may render the economical shipment of food products infeasible. Alternatively, a coarser estimate for the amount of ice packs or blocks, or other temperature control component may be utilized for a given set of porter shipments originating from a common point and being delivered to the same geographic area. However, efficiency is not optimized with such techniques, as there may be substantial variances with respect to the ambient temperature.

Accordingly, there is a need in the art for a system that dynamically evaluates the amount of ice, cold packs, or other thermal control components to incorporate into a shipping vessel such as a porter for perishable food items. There is also a need in the art for such system to base its evaluation on distance and ambient temperatures across the transport route.

BRIEF SUMMARY

The presently disclosed system dispenses thermal control components into a shipping container based upon a dynamic evaluation of environmental conditions along its transportation route. The system places an optimal amount of the thermal control component and positions specific items at specific locations within the porter. The route is calculated from the shipment origin to the order destination, and all zip codes within the route may be collected. Optionally, the distance within the zip code can be calculated along with the average route rate of speed. This information may be used to evaluate the duration of the container is subjected to the temperature while in a particular zip code. The dates are collected for the delivery of the container, and may be checked against a weather forecast system of up to any given number of days that are included in the forecasting system. If the delivery dates extend beyond the forecasting system, the previous almanac data for the dates are used. The temperatures are then averaged using the zip codes along the routes (i.e., "average of temp only") and or the times spent within the particular zip code (i.e., average with time rate"). This final average is then compared to requirements table or matrix that, given a measured value of thermal seepage for a container, determines the amount of ice to use to ensure the temperature range. The items that were selected for the container may be checked against a food sensitivity table. If any item is placed in the container that is sensitive to thermal effects, the ice locations may be moved.

According to one embodiment of the disclosure, there is a dynamic packing system for placing one or more perishable items into a shipping container and dispensing thermal control components therein. The system may include a data processor, and a database including one or more order data sets. Each of these order data sets may be defined at least by an itemized list of purchased perishable items and an order shipment destination address. The system may also include a network interface connected to the data processor. Weather data may be retrieved over the network interface from a remote source. There may also be a dispenser that is controlled by the data processor. A specific amount of thermal control components may be positioned in the shipping container by the dispenser. The specific amount may be based upon an evaluation, by the data processor, of one or more temperature values corresponding to the weather data along a transport route of the shipping container from a shipment origin to the order shipment destination address.

In another embodiment, there is a method dispensing thermal control components in a shipment container including one or more perishable items. The method may include a step of receiving an order data set defined at least by an itemized list of purchased perishable items and an order shipment destination address. There may also be a step of generating a set of geographic identifiers for a transport route between a shipment origin to the order shipment destination address. Then, there may be a step of retrieving weather data from a remote source for each of the geographic identifiers. The method may also include actuating a dispenser to position a predetermined amount of thermal control components in the shipment container for the order data set. This dispensing step may be based upon a correlation of one or more temperature values corresponding to the weather data for each of the geographic identifiers to a requirements matrix. Such a requirement matrix may define associations between specific temperature values and thermal control component amounts.

Certain other embodiments of the present disclosure contemplate respective computer-readable program storage media that each tangibly embodies one or more programs of instructions executable by a data processing device to perform the foregoing method. The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

A dynamic packing system, and more specifically, a packing system that dispenses the optimal thermal control units into a shipping container to maintain cool temperatures across a shipping route based on distance and ambient temperatures across the shipping route is disclosed. The following description is presented to enable one of ordinary skill in the art to make and use the system and to incorporate it in the context of various applications. Possible modifications, as well as alternative uses in different applications will be readily apparent to those skilled in the art, and the general principles defined herein may be applied to a wide range of aspects. Thus, the present disclosure is not intended to be limited to the aspects presented, but is to be accorded the widest scope consistent with the principles and novel features disclosed herein.

In the following detailed description, various specifics are set forth in order to provide a more thorough understanding of the system and methods of the present disclosure. However, it will be apparent to one skilled in the art that the embodiments of the present disclosure may be practiced without necessarily being limited to these specifics. In other instances, well-known structures and devices are shown in block diagram form, rather than in detail, in order to avoid obscuring the present system.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112(f). In particular, the use of "step of" or "act of" in the claims herein is not intended to invoke the provisions of 35 U.S.C. 112(f).

The present disclosure contemplates multiple aspects. The first is a packing system for determining how many ice/cold pack or block units to include within a shipping container to maintain cool temperatures throughout the shipment based on distance and ambient temperatures across the transport route. The system is typically in the form of one or more computer systems operating software or instruction sets that are configured to perform the operations as described herein. This system may be incorporated into a wide variety of devices that provide different functionalities. The second aspect is a method, typically in the form of software, operated using a data processing system (computer). The third aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

Figure 1:
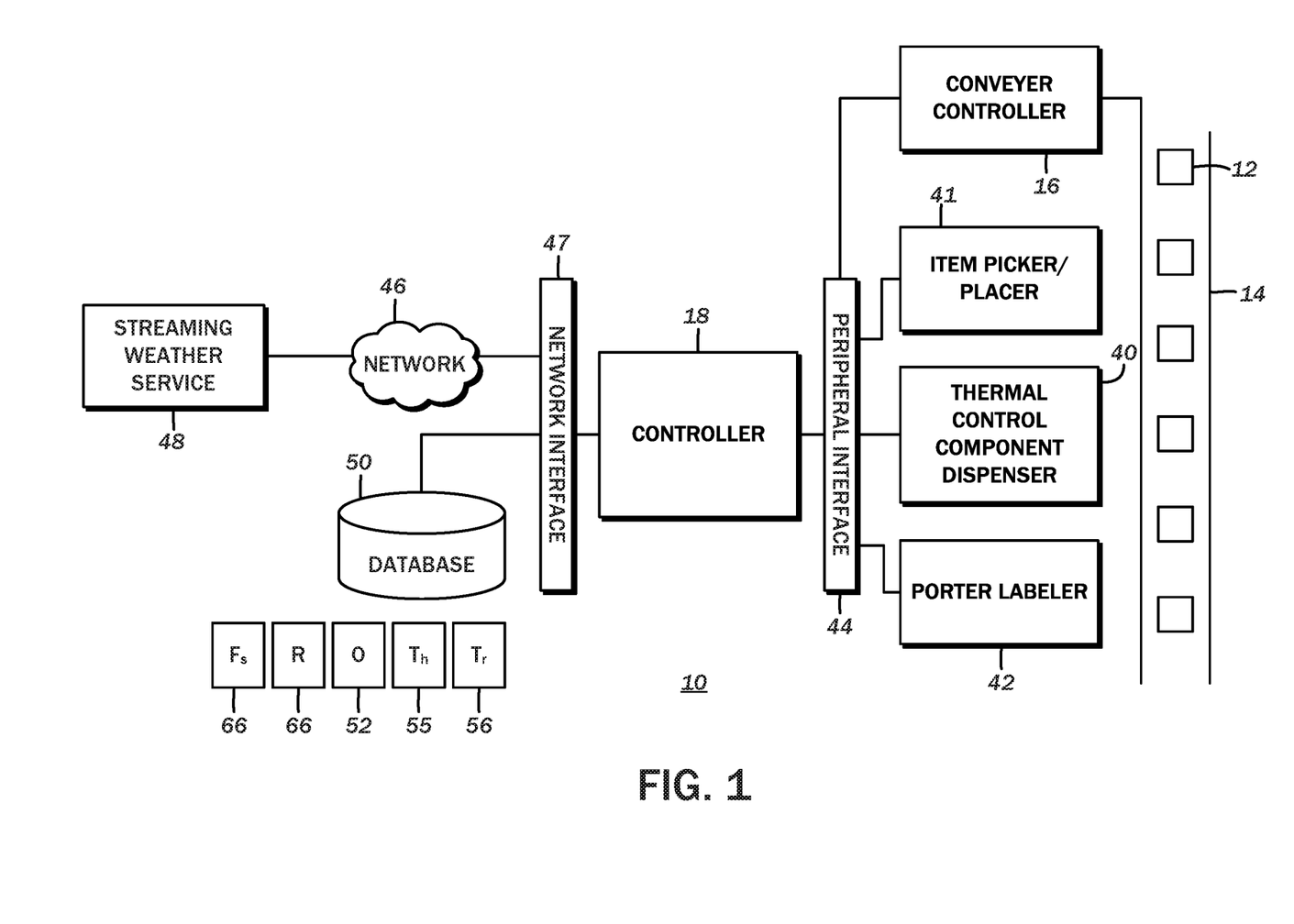
FIG. 1 is a block diagram illustrating one implementation of a dynamic packing system in accordance with the present disclosure.

With reference to the block diagram of FIG. 1, one embodiment of the present disclosure contemplates a dynamic packing system 10 that dispenses an optimized amount of a thermal control component into a porter 12 or other shipping unit. In a preferred, though optional embodiment, the porter 12 is utilized for shipping perishable goods or food items such as fresh vegetables, meat, seafood, dairy products, and the like, as well as wine and other liquid products that are temperature-sensitive. However, this is presented by way of example only, and the porter 12 may be utilized to ship any other type of product. As discussed above, the porter 12 may be a type disclosed in U.S. Pat. App. Pub. No. 2015/0060440, though this is likewise by way of example only and not of limitation. Any other suitable container, box, bag, or the like may be readily substituted without departing from the scope of the present disclosure.

Generally, the porter 12 is carried along a conveyer system 14 or other local area transport modality to multiple stations. One station may be for assembling the porter 12, another one or multiple ones may be for filling with shipping goods, and still another station may involve filling the remainder of the space of the porter 12 with a thermal control component. The present disclosure makes repeated reference to the thermal control component, and in an exemplary embodiment, is understood to refer to ice produced from whatever. However, this example is not intended to be limiting, and any other thermal control component, including "dry" ice, ethylene/diethylene glycol gels and liquids, and so forth. Moreover, to the extent the dynamic packing system 10 is contemplated for use in colder regions requiring warming functions and temperate condition stabilization beyond that which can be provided with insulation, the thermal control component may also refer to a heater compound. For the sake of convenience, however, the thermal control component may simply be referenced as ice, though it will be appreciated that whenever such term is used, it is applicable in the context of the other thermal control components.

In the illustrated embodiment, the dynamic packing system 10 may include a conveyer controller 16 that selectively drives the conveyer system 14. That is, the item placed on the conveyer system, e.g., the porter 12, is advanced from one station to the next upon completion of a previous station. The selective advancement of the conveyer system 14 may be regulated by the conveyer controller 16, though it is understood that the higher level logic to detect when a station is complete and the conveyer system 14 is to be moved such that the porter 12 advances to the next station may be processed by a controller 18.

The controller 18 is configured to perform calculations, processes, operations, and/or functions associated with a set of pre-programmed instructions. In one aspect, certain processes and steps discussed herein may be implemented as a series of instructions (e.g., software program) that reside within computer readable memory units and are executed by one or more processors of the controller 18. When executed, the instructions cause the controller 18 to perform specific actions such as described herein. With additional reference to the block diagram of FIG. 2, the controller 18 includes a central processing unit 20 that execute the pre-programmed instructions. As will be recognized by those having ordinary skill in the art, the central processing unit 20 may be any type of general-purpose data processing device that is programmable with executable instructions to perform various functions. In this regard, the central processing unit 20 may be an application-specific integrated circuit (ASIC), a programmable logic array (PLA), a field programmable gate array, or any other suitable device.

Figure 2:
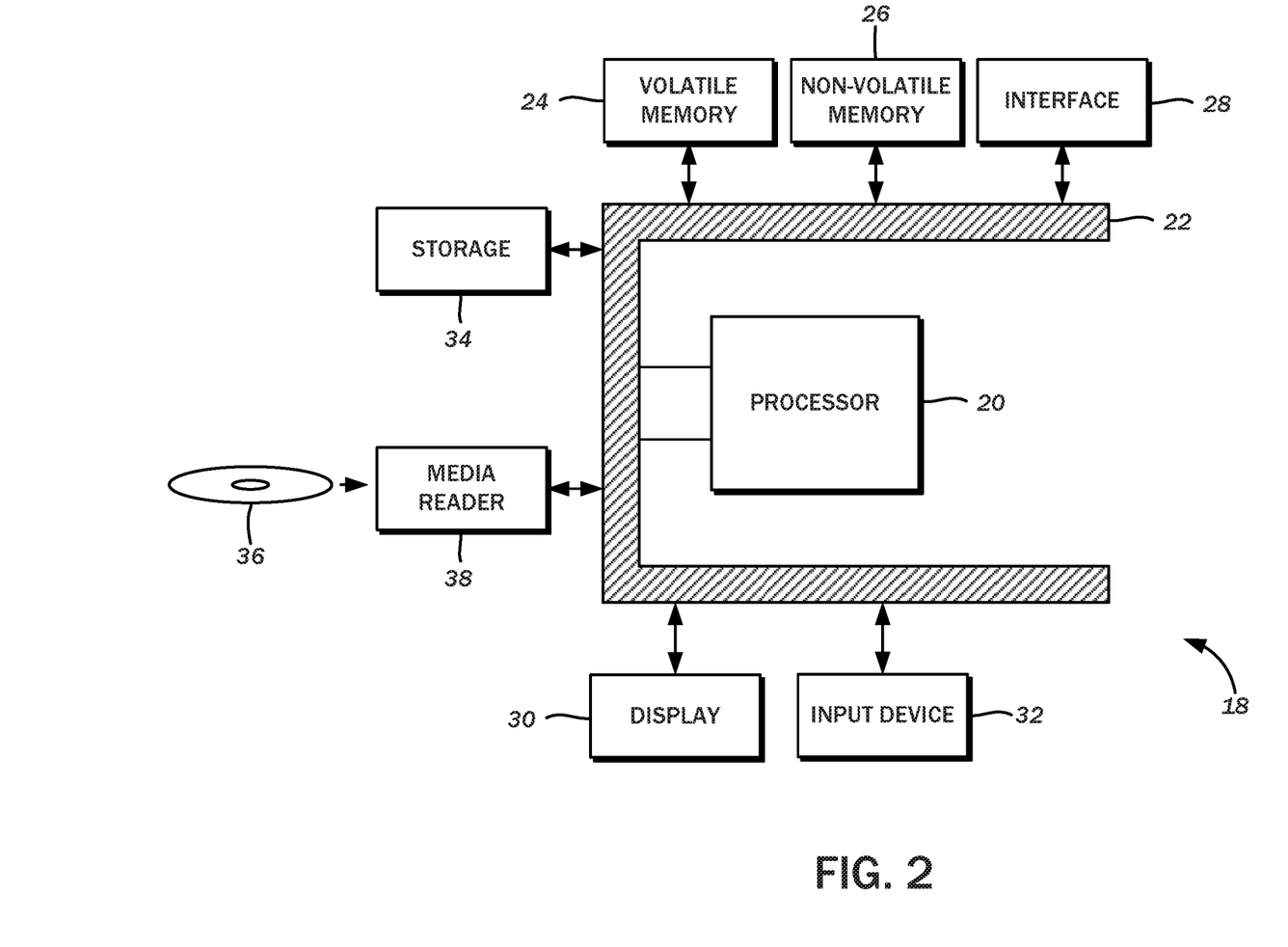
FIG. 2 is a detailed block diagram of the components of a data processing system utilized in various embodiments of the dynamic packing system.

The central processing unit 20 is connected to an address/data bus 22 over which different components of the controller 18 communicate and exchange data. There may be volatile memory 24, also referred to in the art as random access memory or RAM, which temporarily stores data and instructions for immediate and fast access by the central processing unit 20. The controller 18 may also include a non-volatile memory 26 such as read-only memory or ROM, electrical erasable programmable read-only memory (EEPROM), flash memory, and so on that may store static information and instructions for the central processing unit 20 such as the code for a BIOS (basic input/output system) and other such firmware. Both the volatile memory 24 and the non-volatile memory 26 are connected to the central processing unit 20 over the address/data bus 22.

The controller 18 may additionally exchange data with devices external thereto. In this regard, there may be a communications interface 28 that is connected to the central processing unit 20 over the address/data bus 22. The communications interface 28 is understood to include such components as serial ports, modems, network interface cards (both wired and wireless), and others. Typically utilized in industrial applications to interconnect various components and enable data communications is a Controller Area Network (CAN), and so in one embodiment, the communications interface 28 may be a CAN controller. The communications interface 28 may also be an Ethernet network interface card, an RS-485 transceiver, and so on.

Unlike a general-purpose interactive computer system, the controller 18, once configured for automated operation, may require little user intervention. In order to allow an administrator to set configuration options and troubleshoot, the controller 18 may include a display device 30 and one or more input devices 32. One example of a display device is a fully graphical monitor or screen, though any other device that generates an output perceptible by the user may be utilized, such as LED indicators, loudspeakers, buzzers, and so forth. With respect to the input device 32, in a typical configuration this may be an alphanumeric keyboard that may be used by an operator to input commands and other information, set configuration options, and navigate a user interface presented on the display device 30. In another variation, the input device 32 may be a mouse, trackpad, touch screen, or other like cursor control device that likewise may be used to navigate a user interface on the display device 30.

Although the block diagram depicts the display device 30 and the input device 32 as being directly connected to the address/data bus 22, it is understood that this is for simplification purposes only. Conventional display devices 30 may connect to a graphics card via one of several well-known display interconnect standards (which define both physical and logical connections) such as VGA, HDMI, DisplayPort, and others. Along these lines, conventional input devices 32 typically utilize Universal Serial Bus (USB) interconnects, though specialized legacy interconnects may also be utilized.

The controller 18 may also include or at least be connectible to one or more optional data storage devices 34. Like the specific interfaces used for connecting the aforementioned display device 30 and the input device 32, the data storage device 34 may also use specific interfaces such as Serial ATA, Fiber Channel, SCSI, and the like. The data storage device 34 is configured to store data utilized in the presently disclosed system and/or computer executable instructions implementing the methods of the present disclosure. The data storage device 34 may be a magnetic or optical disk drive (e.g., hard disk drive ("HDD"), floppy diskette, compact disk read only memory ("CD-ROM"), digital versatile disk ("DVD"), and so on. It will be appreciated that the controller 18 may connect to one or more of these data storage devices, or none at all.

The controller 18 is presented herein is an example computing environment. However, the non-limiting example of the controller 18 is not strictly limited to being a computer system. Other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one or more aspects of the present technology are implemented by utilizing one or more distributed computing environments, such as where tasks are performed by remote processing devices that are linked through a communications network, or such as where various program modules are located in both local and remote computer-storage media including memory-storage devices.

The present disclosure may be embodied as a computer program product, the corresponding machine-readable instructions being stored in a data storage device 34 that is part of the controller 18, or otherwise closely coupled thereto. Alternatively, the instructions may be stored in a non-transitory, removable data storage device such as an optical disk 36 that is read by a media reader 38 that is part of or at least closely coupled to the controller 18. The term "instructions" as used with respect to this invention generally indicates a set of operations to be performed on a computer or other data processing device, and may represent pieces of a whole program or individual, separable, software modules. Non-limiting examples of "instruction" include computer program code (source or object code) and "hard-coded" electronics (i.e. computer operations coded into a computer chip).

Referring again to the block diagram of FIG. 1, the controller 18 regulates the transport of the porter 12 along the conveyer system 14, with commands being generated by the controller 18 to the conveyer controller 16. The controller 18, or the conveyer controller 16, may be connected to sensors that detect conditions along the line, though the details thereof have been omitted for the sake of simplification. The conveyer controller 16 may handle lower level functions with respect to the conveyer system 14 such as driving the motor that moves the conveyer belt, stopping the conveyer system when an obstruction is detected, and so on. Higher level functions, particularly those that may involve coordination with other stations, may be handled by the controller 18.

An embodiment of the present disclosure contemplates the dispensing of a thermal control component, e.g., ice, into a porter 12 containing perishable goods that must be maintained within a certain temperature range. To this end, the controller 18 is connected to a thermal control component dispenser 40, which may be referred to more simply as a dispenser 40. In general, the dispenser 40 is understood to include a reservoir in which a thermal control component is stored at a stabilized/refrigerated temperature. Via actuators, valves, and other control devices, a suitable volume of the thermal control component is dispensed when the porter 12 becomes positioned adjacent to a dispensing nozzle. The specific volume to be dispensed is understood to vary depending on the destination of the porter 12, as well as the route it traverses before reaching the destination.

Prior to the thermal control component dispensing step, however, there may also be an item picker/placer 41 that selects one or more items in the order from a storage bin, and places the same into the porter 12. Those having ordinary skill in the art will recognize that a variety of robotic machinery may be utilized as the item picker/placer 41. The specifics of the movement of the mechanical components may be governed by the internal circuitry of the item picker/placer 41, but the general selection of items to place into the porter 12 may be commanded by the controller 18, as it has access to order information.

By way of example, the dynamic packing system 10 may include a porter labeler 42 that affixes a destination address along with other indicia utilized for tracking the shipment. This function is understood to be related to the thermal control component dispensation step, in that the same information utilized for addressing the porter 12 is used for determining the specific amount of the thermal control component to be dispensed. Those having ordinary skill in the art will recognize that there are various configurations of the porter labeler 42, particularly those that are installed along a conveyer system. Beyond the conveyer stations of the dispenser 40 and the porter labeler 42, there may be others that process or otherwise manipulate the porter 12 after assembly and until it is loaded into a transport vehicle. Such additional stations are deemed to be within the purview of one having ordinary skill in the art, and the details thereof are omitted for the sake of simplicity. The controller 18 interfaces with the conveyer controller 16, the dispenser 40, the picker/placer 41, and the porter labeler 42 over a peripheral interface 44.

According to one embodiment, the controller 18 commands the dispenser 40 to add an exact amount of the thermal control component to ensure that the interior of the porter 12 is maintained at a predetermined temperature to prevent spoilage of the perishable items contained therein, with the temperature along the shipping route being factored for optimal effect. In one implementation, for example, zip codes along the route can be used with delta times being added at the stops to determine an average temperature. A corresponding value on a lookup table may be retrieved based upon the average temperature in order to determine the amount of ice to place, and the specific placement configuration. Additionally, it is contemplated that route mapping and positional placement of the thermal control components, as well as the food or other products within the porter 12. Consequently, the present disclosure not only establishes environment temperatures along the route but also includes procedures to place the ice in the porter 12 at various locations to maintain a consistent temperature.

The current ice in the porter 12 is dependent upon the location and heat sensitivity of particular food. Again, as indicated above, ambient temperature conditions may exist that affect the porter 12 during transport (e.g., on a 2 day journey, etc.). The ice or thermal control components are placed in the porter 12 in various locations. To keep food or other perishable items from being frozen or in unsafe conditions, the temperature within the porter 12 is maintained within a desired range, e.g., between 32 and 39 degrees Fahrenheit. Changing the ice position and amount in the container are understood to maintain the correct temperature for this duration of transport. In addition, the porter 12 may be configured to disperse the temperature correctly throughout the area of its contents. It should be noted that the dynamic packing system 10 as described herein can be used with any items that are desired to be maintained at a cool temperature (any desired temperature range), including food, body organs, etc. Furthermore, although the shipping porter 12 is provided as a non-limiting example, the present invention can be used with any shipping container, and the porter can be any size or dimension.

To determine the desired thermal control components to include, the dynamic packing system 10 contemplates a number of procedures. According to one aspect of the present disclosure, streaming or other weather forecast data is collected based on time and temperature to a desired zip code. Referring again to the block diagram of FIG. 1, the controller 18 may establish a data communications link to an external network 46. To facilitate this connection, the dynamic packing system 10 may include a network interface 47, which may generally correspond to the aforementioned communications interface 28 associated with the controller 18. The external network 46 may be the Internet, and the weather forecast data may be collected from a streaming weather service 48 such as weather.com or weather.gov, or any other site or database in which weather forecasting data may be obtained. Historical weather data from a different service, or data stored locally on a database 50 be utilized when real-time forecasts are not yet available. As referenced herein, historical weather data is understood to be observed weather data from an earlier date, which is related to the current date. One exemplary embodiment contemplates the retrieval of weather data for the same date from the year prior, while in another embodiment, averaged values for the same date from multiple years prior may be utilized. In another aspect, all zip codes along the shipping route to the final delivery point may be examined.

There is also contemplated an aspect involving the determination of the range of temperatures along the route, and factors in the specific contents of the porter 12 to the extent it may be temperature-sensitive, and determines the specific location in which the ice or thermal control component may be positioned within the interior space thereof. Adding, or subtracting the number of thermal control components is contemplated to maintain the refrigerated temperature. Again, the may use different substances as the cold units instead of ice and may be factored in as a replacement. Thus, in some aspects, a phase change material may be used to keep external temperatures (such as constant cold along a route) from dipping the internal temperature of the container.

With reference to the flowchart of FIG. 2A, one embodiment of the present disclosure contemplates a method dispensing thermal control components within a container or porter 12 including one or more perishable items. The method begins with a step 100 of retrieving the zip codes along the route for the order. At the beginning of the process, the origin address/zip code of the shipper is known, as is the destination address/zip code of the purchaser of the items contained within the porter 12.

Although a wide range of order fulfillment technologies are known in the art, in an exemplary embodiment, the customer may place an order for certain goods on a website associated with operator of the dynamic packing system 10. That order, along with others, may be stored in the database 50, with an order data set 52 containing the details of the order, including the items in the order, the identity of the account holder placing the order, and so forth. Phone and mail-based order fulfillment is also understood to be possible. In some embodiments, the dynamic packing system 10 is utilized in connection with a subscription-based meal kit delivery service, so the order placement may differ slightly from other e-commerce systems in which an order is generated in response to a purchaser specifying each purchased item. Specifically, the order may be for a broadly defined meal, rather than the individual items used in the preparation of the meal. Furthermore, because the service is offered as a subscription, the order placement for a given meal kit may recur automatically without user intervention.

Figure 4:
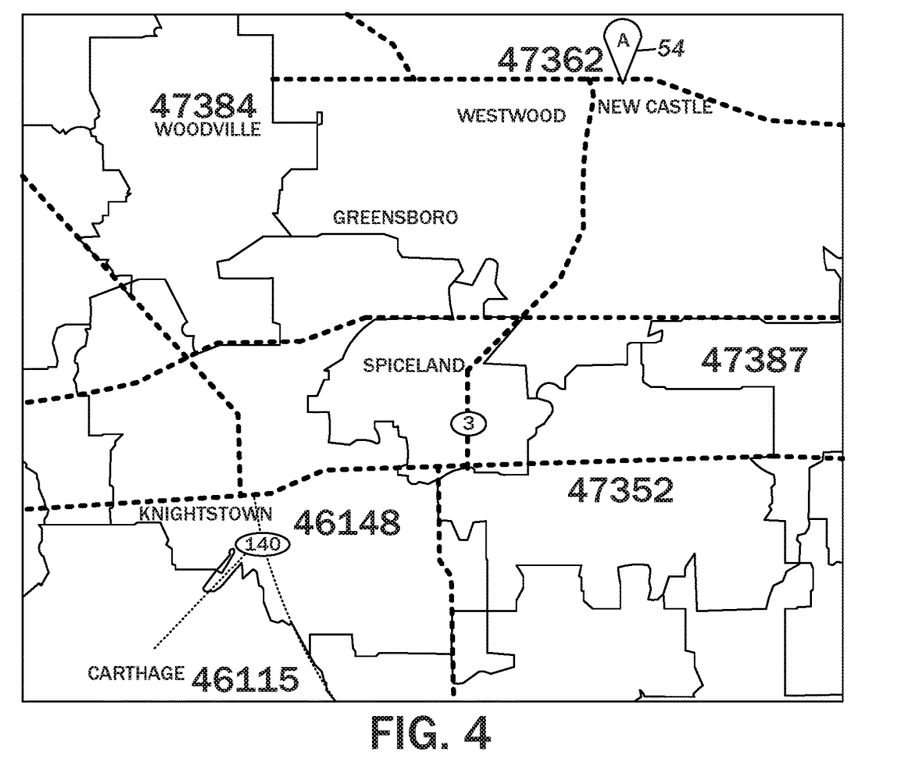
FIG. 4 is an exemplary map illustrating a possible path a porter may take from an origin location to a destination location.

Referring to the exemplary map of FIG. 4, the shipment may originate from "New Castle," a town that is designated with a marker 54. The destination of the shipment, in turn, may be the town of "Carthage." The origin is in zip code 47362, while the destination is in zip code 46115. A direct path from the origin to the destination based on longitude and latitude also covers the 46148 zip code. Thus, the zip codes pertaining to this order is understood to be 47632, 46148, and 46115, and these are the values that are collected in the step 100.

The method proceeds to a decision step 102, in which the timeframe for commencing shipment is determined. That is, if it is determined that the order is to be fulfilled later than a predetermined future date/time, the method proceeds to a step 104 of retrieving temperatures for historical temperature values for each of the zip codes identified in step 100. As indicated above, these historical temperature values may be stored locally in the database 50 as a first temperature data set ($T_h$) 55. These values may be retrieved from an alternative service connected to the external network 46, or any other source.

If, on the other hand, it is determined that the order is to be fulfilled earlier than a predetermined future date/time, that is, it is anticipated that real-time weather data is available, the method proceeds to a step 106 of retrieving the temperature values for each of the identified zip codes in step 100. Again, these values may be retrieved from the streaming weather service 48, or they may be stored locally in the database 50 as a second temperature data set ($T_r$) 56.

Figure 5:
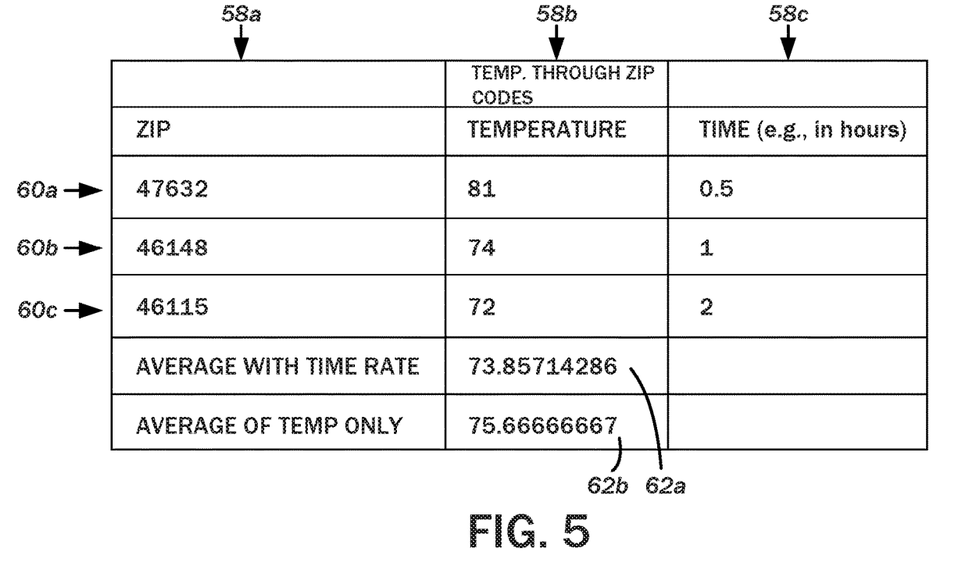
FIG. 5 is a table of average temperatures across a transport route utilized in various embodiments of the method for dispensing thermal control components.

Regardless of the origin of the data, the method proceeds to a step 108 of collecting the temperatures and time within each zip code for the computed route between the origin and the destination. The exemplary table of FIG. 5 lists each of the zip codes in a first column 58a, with a first row 60a corresponding to the 47632 zip code, a second row 60b corresponding to the 46148 zip code, and the third row 60c corresponding to the 46115 zip code. The temperature collected for the intermediate zip code, 46148, is set forth in the second row 60b in the second column 58b, which lists a value of 74 degrees Fahrenheit. The method proceeds to a step 110 of adding the temperature at the origin and the destination. Additionally, an estimate of the customer wait/pickup time may be derived. The corresponding temperatures for each zip code are listed in a second column 58b, with the first row 60a thereof for the origin listing a value of 81 degrees Fahrenheit, and the third row 60c thereof for the destination listing a value of 72 degrees Fahrenheit.

Figure 3A:
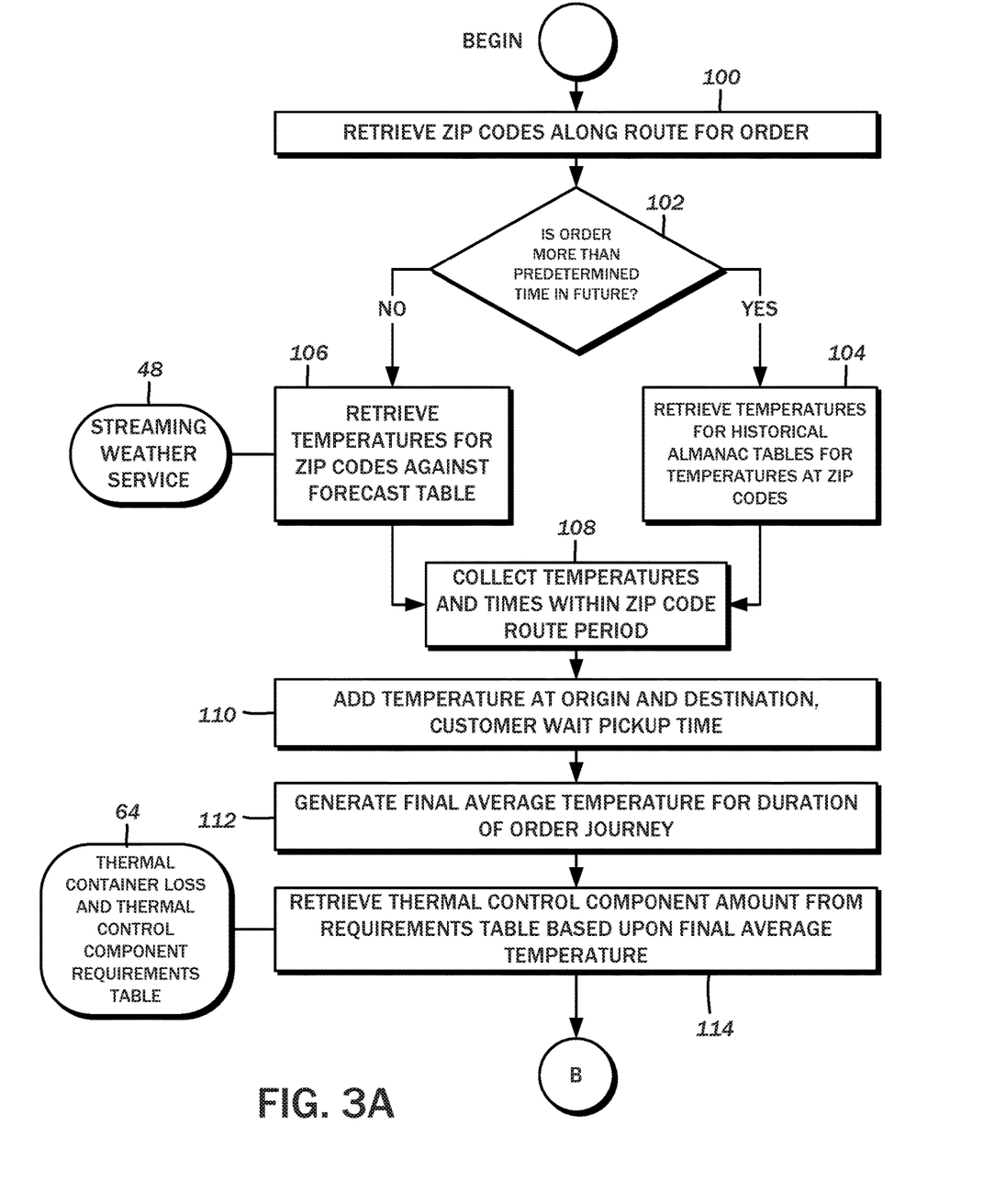
FIG. 3A is a flowchart depicting a first part of one embodiment of a method for dispensing thermal control components as implemented in a dynamic packing system according to the present disclosure.
Figure 3B:
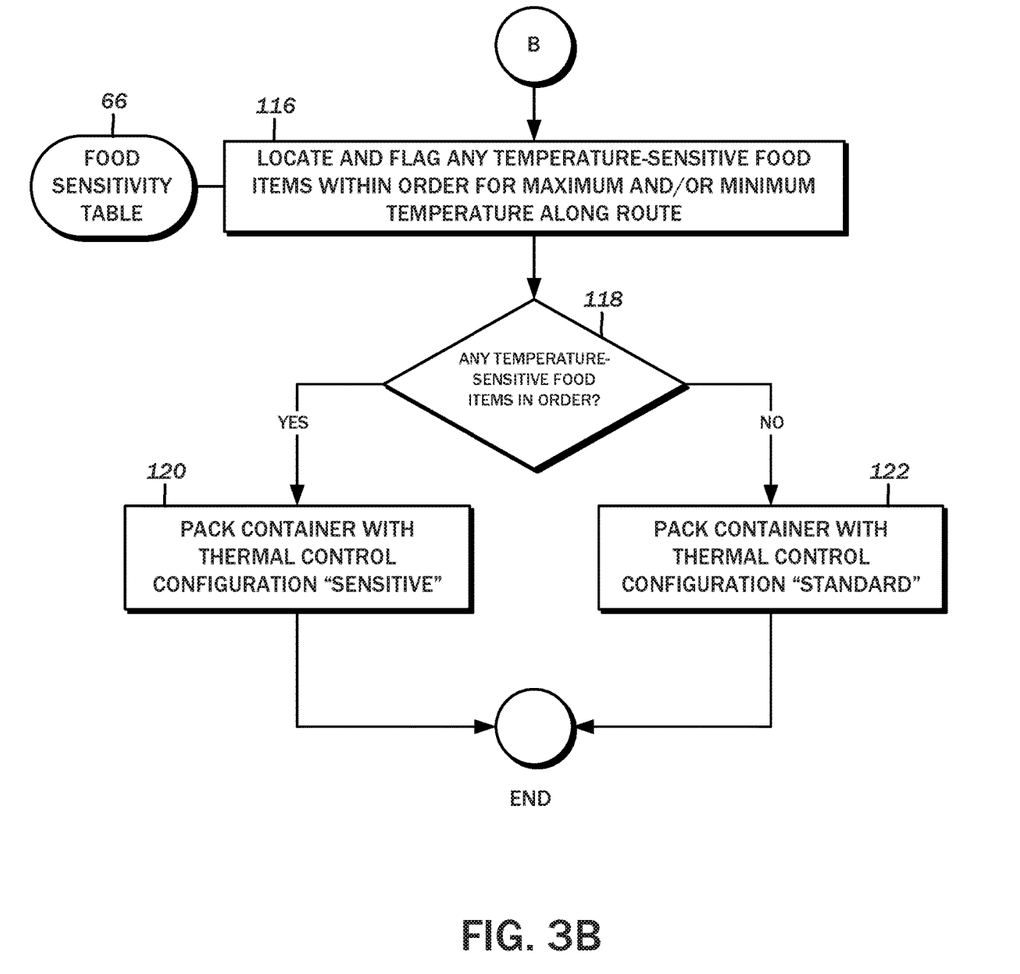
FIG. 3B is a flowchart depicting a second part of the method for dispending thermal control components.

The method includes a step 112 of generating a final average temperature for the duration of the order or journey of the porter 12 from the origin to the destination. Referring again to the table of FIG. 3, the average temperature is set forth in a cell 62b as 75.6666667 degrees Fahrenheit. This computation of average is understood to ignore the relative time anticipated to be spent in each zip code. A third column 58c includes values for the total time anticipated to be spent during transport in each zip code. As shown in the first row 60a, the porter 12 is anticipated to spend approximately 0.5 hours in the 47632 zip code. As shown in the second row 60b, approximately one hour is anticipated for the 46148 zip code. The third row 60c lists a time of approximately two hours being anticipated for the 46115 zip code. These values may be based upon a computation of distance in each zip code along the transport route and the average speed of a delivery vehicle. A second computation of the average temperature factoring in the time spent in each zip code is set forth in a cell 62a as 73.85714286 degrees Fahrenheit.

In whichever form selected, the generated average temperature for the delivery route forecasted for the date(s) of delivery is correlated to a thermal control component amount in a step 114. The amount of the thermal control component to be utilized is set forth in a requirements table 64. The data in the requirements table 64 may be shifted for the known thermal seepage for a given porter 12 or container, and the volume of the thermal control component to be dispensed may be adjusted accordingly.

Referring to the flowchart of FIG. 2B, the method continues with a step 116 of locating and flagging any temperature-sensitive food items within the order. The identification may be based upon a food sensitivity table 66. If any item placed in the porter 12 is particularly sensitive to thermal shock, the positioning of the thermal control component may be moved. In this regard, the thermal control component dispenser 40 is understood to incorporate a movable arm that allows for such specific positioning of the dispenses thermal control component within various parts of the porter 12. The positioning of the arm may be governed by the instructions provided by the controller 18.

The food sensitivity table 66 may define certain goods as heat-sensitive, or alternatively, cold-sensitive. With a heat-sensitive configuration, the items may be packed by the picker/placer 41 to place such heat-sensitive items at the bottom of the porter 12. With a cold-sensitive configuration, the items so designated may be placed toward the top of the porter 12.

The method may also include an evaluation step 118 of determining whether there are any temperature-sensitive food items in the order. If there are temperature-sensitive food items, according to a step 120 there is a step of packing the thermal control component with a "sensitive" configuration. Otherwise, the method proceeds to a step 122 of packing the thermal control component with a "standard" configuration.

Once the items are placed in the porter 12, or simultaneously with the placement of the items, or before placement of the items, the dynamic packing system 10 may dispense the thermal control components in an amount previously derived according to the steps described above.

The particulars shown herein are by way of example only for purposes of illustrative discussion, and are presented in the cause of providing what is believed to be the most useful and readily understood description of the principles and conceptual aspects of the various embodiments of the dynamic packing system. In this regard, no attempt is made to show any more detail than is necessary for a fundamental understanding of the different features of the various embodiments, the description taken with the drawings making apparent to those skilled in the art how these may be implemented in practice.

What is claimed is:

1. A dynamic packing system for placing one or more perishable items into a shipping container and dispensing thermal control components therein, the system comprising:
    a data processor;
    a database including one or more order data sets each being defined at least by an itemized list of purchased perishable items and an order shipment destination address;
    a network interface connected to the data processor, weather data being retrieved over the network interface from a remote source; and
    a dispenser controlled by the data processor, a specific amount of thermal control components being positioned in the shipping container by the dispenser in response to an evaluation by the data processor of one or more temperature values corresponding to the weather data along a transport route of the shipping container from a shipment origin to the order shipment destination address.

2. The system of claim 1, wherein the order shipment destination address, the shipment origin, and the transport route are defined by one or more zip code values, the weather data of the order shipment destination address, the shipment origin, and the transport route being retrieved from the remote source based upon the respective zip code values thereof.

3. The system of claim 2, wherein the one or more temperature values is an average of temperatures from the weather data for each of the respective zip code values of the shipment origin, the transport route, and the order shipment destination address.

4. The system of claim 2, wherein the one or more temperature values is an average of temperatures from the weather data for each of the respective zip code values of the shipment origin, the transport route, the order shipment destination address, and related time factors corresponding to an anticipated duration in each zip code during transport.

5. The system of claim 1, wherein the remote source is a historical weather archive, and the weather data is historical weather data for a past date related to a current date.

6. The system of claim 1, wherein the remote source is a streaming weather service, the weather data from the streaming weather service being a future forecast having a predefined forecast duration.

7. The system of claim 1, further comprising:
    an item picker/placer controlled by the data processor, the item/picker placer positioning the perishable items into the shipping container based upon the one or more order data sets.

8. The system of claim 7, wherein the item picker/placer, in response to control commands from the processor, places a specific one or more of the perishable items apart from the thermal control component based upon an evaluation of the specific one or more of the perishable items being identified as being temperature-sensitive.

9. The system of claim 8, wherein the identification of the specific one of the one or more perishable items is stored in a food sensitivity table on the database.

10. The system of claim 1, wherein the thermal control component is ice.

11. A method dispensing thermal control components in a shipment container including one or more perishable items, the method comprising:
    receiving an order data set defined at least by an itemized list of purchased perishable items and an order shipment destination address;
    generating a set of geographic identifiers for a transport route between a shipment origin to the order shipment destination address;
    retrieving weather data from a remote source for each of the geographic identifiers; and
    actuating a dispenser to position a predetermined amount of thermal control components in the shipment container for the order data set based upon a correlation of one or more temperature values corresponding to the weather data for each of the geographic identifiers to a requirements matrix defining associations between specific temperature values and thermal control component amounts.

12. The method of claim 11, wherein the geographic identifiers are zip code values.

13. The method of claim 12, wherein the one or more temperature values is an average of temperatures from the weather data for each of the respective zip code values of the shipment origin, the transport route, and the order shipment destination address.

14. The method of claim 11, wherein the one or more temperature values is an average of temperatures from the weather data for each of the respective zip code values of the shipment origin, the transport route, the order shipment destination address, and related time factors corresponding to an anticipated duration in each zip code during transport.

15. The method of claim 11, wherein the weather data is historical value for a past date related to a current date, the weather data being retrieved from a historical weather archive.

16. The method of claim 11, wherein the weather data is a future forecast with a predefined forecast duration.

17. The method of claim 11, further comprising:
retrieving, with an item picker/placer, at least one of the perishable items specified in the itemized list of the order data set from a storage container; and
positioning the perishable item into the shipment container.

18. The method of claim 11, further comprising:
applying a shipping label to the shipment container with the order shipment destination address.

19. The method of claim 11, wherein the thermal control component is ice.

20. An article of manufacture comprising a non-transitory program storage medium readable by a computer, the medium tangibly embodying one or more programs of instructions executable by the computer to perform a method for dispensing thermal control components in a shipment container including one or more perishable items, the method comprising:
receiving an order data set defined at least by an itemized list of purchased perishable items and an order shipment destination address;
generating a set of geographic identifiers for a transport route between a shipment origin to the order shipment destination address;
retrieving weather data from a remote source for each of the geographic identifiers; and
actuating a dispenser to position a predetermined amount of thermal control components in the shipment container for the order data set based upon a correlation of one or more temperature values corresponding to the weather data for each of the geographic identifiers to a requirements matrix defining associations between specific temperature values and thermal control component amounts.

* * * * *